United States Patent
Solodovnikov et al.

(10) Patent No.: US 10,599,861 B2
(45) Date of Patent: Mar. 24, 2020

(54) SYSTEM AND METHOD FOR ACCESS CONTROL USING ACLS

(71) Applicant: AO Kaspersky Lab, Moscow (RU)

(72) Inventors: Andrey Y. Solodovnikov, Moscow (RU); Maxim V. Klimenchuk, Moscow (RU); Maxim V. Yudin, Moscow (RU); Vasily N. Isakov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 169 days.

(21) Appl. No.: 15/476,055

(22) Filed: Mar. 31, 2017

(65) Prior Publication Data

US 2018/0225473 A1    Aug. 9, 2018

(30) Foreign Application Priority Data

Feb. 8, 2017 (RU) ................................ 2017104134

(51) Int. Cl.
*G06F 21/00* (2013.01)
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC .... G06F 21/62; G06F 21/6218; G06F 21/604; G06F 2221/2141
See application file for complete search history.

(56) References Cited

U.S. PATENT DOCUMENTS

| | | | | |
|---|---|---|---|---|
| 8,719,903 | B1* | 5/2014 | Kilday | G06F 21/62 726/4 |
| 2004/0210755 | A1* | 10/2004 | Becker | G06Q 50/22 713/167 |
| 2006/0265734 | A1* | 11/2006 | Chen | G06F 21/71 726/2 |
| 2008/0104393 | A1* | 5/2008 | Glasser | G06F 17/30575 713/165 |
| 2009/0172797 | A1* | 7/2009 | Yao | G06F 21/604 726/9 |

(Continued)

FOREIGN PATENT DOCUMENTS

EP    1668437 B1    4/2010

*Primary Examiner* — Alexander Lagor
*Assistant Examiner* — Michael M Lee
(74) *Attorney, Agent, or Firm* — Arent Fox LLP; Michael Fainberg

(57) ABSTRACT

Disclosed are systems and method for controlling access to objects of an operating system using Access Control Lists (ACLs). An exemplary method comprises: generating, by a processor, one or more ACLs for objects of the operating system based on at least one access rule specifying the access mode to the object of the operating system to one or more users based on the one or more categories to which the objects belongs; intercepting a request from a user to access an object of the operating system; determining, by the processor, one or more ACLs associated with the requested object; and applying, by the processor, the determined one or more ACLs to decide whether to allow or deny access of the user to the requested object, wherein if one of the applied ACLs denies access to the object, the access will be blocked, otherwise the access will be allowed.

18 Claims, 3 Drawing Sheets

(56) References Cited

U.S. PATENT DOCUMENTS

| | | | |
|---|---|---|---|
| 2010/0319067 A1* | 12/2010 | Mohanty | G06F 21/6218 726/21 |
| 2011/0125799 A1* | 5/2011 | Kandasamy | G06F 21/6218 707/785 |
| 2013/0160076 A1* | 6/2013 | Morita | G06F 21/604 726/1 |
| 2015/0100791 A1* | 4/2015 | Chen | G06F 12/1408 713/189 |
| 2016/0072814 A1* | 3/2016 | Martinelli | H04L 63/101 726/1 |
| 2016/0352744 A1* | 12/2016 | Burrows | H04L 63/101 |

* cited by examiner

SYSTEM AND METHOD FOR ACCESS CONTROL USING ACLS

CROSS-REFERENCE TO RELATED APPLICATIONS

This application claims benefit of priority under 35 U.S.C. 119(a)-(d) to a Russian Application No. 2017104134 filed on Feb. 8, 2017, which is incorporated by reference herein.

FIELD OF TECHNOLOGY

The present disclosure related generally to the field of application control, and more specifically, to systems and methods of access control using access control lists (ACL).

BACKGROUND

At present, corporate networks make wide use of solutions in the field of application control, particularly control of the launching and running of applications. With the help of such solutions, it is easier for the administrator or any other specialist responsible for network security to control which applications are being used and launched on the computers of the network. With the help of application control, the administrator can, for example, determine which applications can be launched and which cannot, and which exceptions can occur in either instance. Modern systems of application control have a flexible toolkit for the forming of access control rules to the objects of operating systems (OS), including the files of applications: the access may occur either on the basis of lists of forbidden and permitted applications, or on the basis of more complicated access rules which take into account different attributes of both the access itself, such as the access token, and the object to which said access occurs.

However there are a number of features of the later versions of Windows OS, such as version 10, which dictate the architecture of the application control systems: certain information which is used by the application control system to search for access rules regulating the access to a certain object, and also for making a decision on the granting of access to that object (for example, for the application control systems of Kaspersky Lab such information might be information on the electronic digital signature—EDS) is not accessible to components of the application control system which are launched in kernel mode, while a number of other components, such as those intercepting access to objects of the operating system, need to work in kernel mode. The switching between user mode and kernel mode during the working of the application control system is a tedious operation, requiring a lot of time (as compared to an execution without switching).

Accordingly, there is a need to improve application access control system.

SUMMARY

Disclosed are systems and methods of access control based on access control lists (ACL). In one exemplary aspect, a computer-implemented method for controlling access to objects of an operating system using ACLs comprises: generating, by a processor, one or more ACLs for objects of the operating system based on at least one access rule specifying the access mode to the object of the operating system to one or more users based on the one or more categories to which the objects belongs; intercepting a request from a user to access an object of the operating system; determining, by the processor, one or more ACLs associated with the requested object; and applying, by the processor, the determined one or more ACLs to decide whether to allow or deny access of the user to the requested object, wherein if one of the applied ACLs denies access to the object, the access will be blocked, otherwise the access will be allowed.

In one exemplary aspect, generating, by a processor, one or more ACLs for objects of the operating system further includes determining one or more categories of each object based on a metadata of said object.

In one exemplary aspect, when at least one ACL denies access to the object, the access will be blocked, otherwise the access will not be blocked.

In one exemplary aspect, the access rule is presented in form: $R_i = (\{(U, A)\}, P)$, where $R_i$ is the access rule for an object of the operating system of i-th category, P is an attribute: default deny or default access, $\{(U,A)\}$ is a set of pairs $(U_k, A_k)$, where $U_k$ is a k-th user, $A_k$ is the access mode: access deny or access allowed, to the user $U_k$.

In one exemplary aspect, the ACL is presented in form: $ACL_j = \{(U, A)\}$, where $ACL_j$ is an access control list for the j-th object of the operating system; A is the access mode for a user U, and wherein the ACL has by default the attribute "default deny".

In one exemplary aspect, when the object of the operating system is a file or registry key, generating one or more ACLs for the object of the operating system further includes generating one or more ACLs for other objects of the operating system located together with the object on the same level of the treelike file directory or registry key directory.

In one exemplary aspect, a system for controlling access to objects of an operating system using ACLs comprises a hardware processor configured to: generate one or more ACLs for objects of the operating system based on at least one access rule specifying the access mode to the object of the operating system to one or more users based on the one or more categories to which the objects belongs; intercept a request from a user to access an object of the operating system; determine one or more ACLs associated with the requested object; and apply the determined one or more ACLs to decide whether to allow or deny access of the user to the requested object, wherein if one of the applied ACLs denies access to the object, the access will be blocked, otherwise the access will be allowed.

In one exemplary aspect, a non-transitory computer readable medium storing thereon computer executable instructions for controlling access to objects of an operating system using ACLs includes instructions for: generating, by a processor, one or more ACLs for objects of the operating system based on at least one access rule specifying the access mode to the object of the operating system to one or more users based on the one or more categories to which the objects belongs; intercepting a request from a user to access an object of the operating system; determining, by the processor, one or more ACLs associated with the requested object; and applying, by the processor, the determined one or more ACLs to decide whether to allow or deny access of the user to the requested object, wherein if one of the applied ACLs denies access to the object, the access will be blocked, otherwise the access will be allowed.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
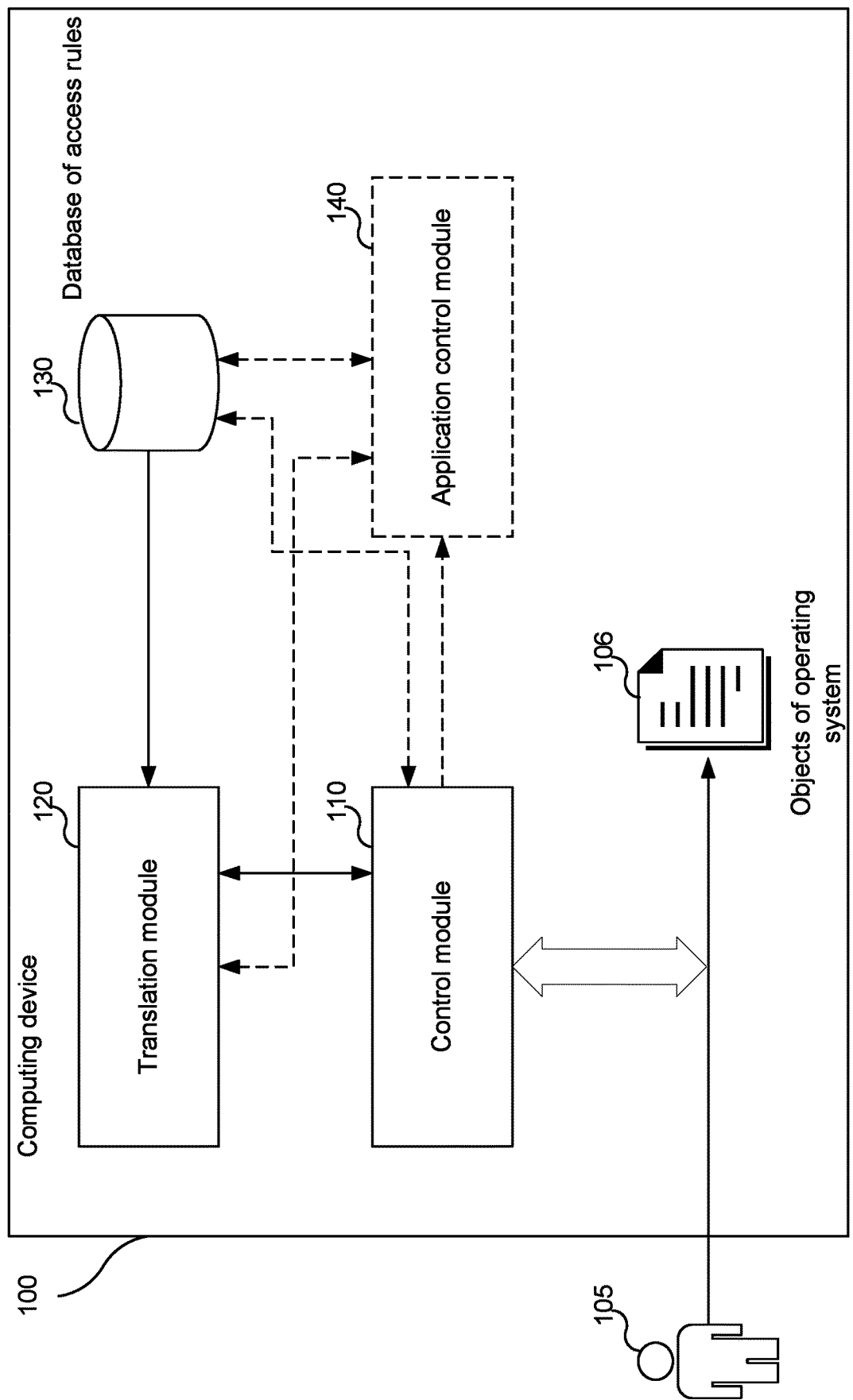
FIG. 1 shows an example of a system for access control using ACL.

Example aspects on the invention are described herein in the context of a system, method and computer program product for access control based on access control lists (ACL). Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspects of the invention:

An object of an operating system is at least a file, a registry entry, or any other securable object (msdn.microsoft.com/ru-ru/library/windows/desktop/aa379557(v=vs.85).aspx), being any object in the operating system (OS) Windows which has a security descriptor (msdn.microsoft.com/ru-ru/library/windows/desktop/aa379563(v=vs.85).aspx), containing at least a security identifier (SID) (msdn.microsoft.com/ru-ru/library/windows/desktop/aa379571(v=vs.85).aspx) of the owner of the object (for example, an account record of the user who created the file, provided that the object of the operating system is a file), and a discretionary access control list (DACL) (msdn.microsoft.com/ru-ru/library/windows/desktop/aa374872(v=vs.85).aspx). How the DACL is employed in the OS Windows is described in documentation from Microsoft: msdn.microsoft.com/ru-ru/library/windows/desktop/aa446683(v=vs.85).aspx, while device principles and features of the use of the DACL are generally known to those of ordinary skill in software development.

Access to an object of the operating system is at least a calling of one of the system functions for loading the object of the operating system or a portion thereof into the random access memory, for example, Loadlibrary, OpenFile, RegCreateKey, CreateProcess or others.

In one exemplary aspect, the determination of the account record of the user in whose name access is being granted may include the identification of at least the security identifier (SID). The security identifier may be stored in an access token, the token being formed by the OS upon authorization of the user on a computing device. In one exemplary aspect, the determination of the account record of the user in whose name access is being granted may include the determination (identification) of the access token.

A rule of access to an object of the operating system is an access rule which describes the mode of access to the object of the operating system by at least one user (using the account record of at least one user) or group of users (i.e., situations are possible where the access rule describes access on the part of several users and/or several groups of users), and it also has one of two attributes: "default deny" or "default access"; the access mode being either "access allowed" or "access denied". If a rule prescribes the access mode "access allowed" in regard to a particular object of the operating system, then in keeping with this rule the access to that object should be allowed (not denied), for example, by means of an application control module. If a rule prescribes an access mode "access denied" in regard to a certain object of the operating system, then in keeping with this rule the access to that object should be denied, for example by means of the application control module.

In one exemplary aspect, the rules of access to an object are used by the application control module. An example of an application control module is Kaspersky Endpoint Security (KES) or other security program. It should be noted that the application control module can have a working parameter (which can be established for the application control module, for example, by the network administrator, and if no working parameter is established it is considered that it takes on a value of "default access"), taking on values of "default access" or "default deny". The value "default access" of the working parameter means that access to the object of the operating system will be granted if the access is not explicitly denied (for example, in accordance with the access rule). The value "default deny" of the working parameter means that access to the object of the operating system will be denied (blocked) unless the access is explicitly allowed (for example, in accordance with the access rule).

FIG. 1 shows a diagram of an exemplary aspect of the access control system based on an access control list (ACL). The ACL as used herein, may include, but not limited to, one of its types in the OS of the Windows family, namely the DACL—discretionary access control list, describing which user has which right in regard to a certain object of the OS. In one exemplary aspect, the access control system 100 includes a control module 110 and a translation module 120, which may be deployed on the same computing device. The system 100 may also include a database of access rules 130 and an application control module 140, which may be deployed on the same computing device. In another exemplary aspect, the translation module 120 may be located outside of said computing device, for example, on a remote server. In such a situation, the translation module 120 is connected to the modules 110, 120 and 130 by a data transmission network, such as the Internet.

The control module 110 is configured to intercept access to the object of the operating system; wherein as a result of the intercepting, the account record of the user is determined which is to be used for the access; to apply the set of ACLs for the object of the operating system to which access has been intercepted to the account record of the user; and also to block access to the object of the operating system if a decision has been made to block access to the object; wherein the set of ACLs makes a decision as to whether to block access to the object or not; in one exemplary aspect, the control module operating in kernel mode.

The control module 110 intercepts access to the object of the operating system using a component realized in the form of a driver, which may be inserted into the stack of system function calls by means of which access is granted to the object of the operating system 106. For ease of description, a file will be used as an example of the object of the operating system 106, namely an executable file of a program, references to which in the description shall also be designated as 106 in FIG. 1. However, many other types of objects of the OS exist.

It should be noted that, in the framework of the computing device, a user 105 interacts only with the I/O devices and does not directly perform any other actions, such as access to objects of the operating system 106. Furthermore, the user 105 shall have an account record being used on the computing device. And, access carried out by the user 105 shall mean access carried out with the use of the account record of the user 105, for example, using the access token created by the operating system upon successful authentication of the user 105.

Upon detecting an access by the user 105 (it should be kept in mind that the access is carried out by means of an application, for example, one launched by the user 105) to the file 106, the control module 110 determines the account record of the user 105 which is being used for the access. In one exemplary aspect, the result of the determining of the account record is a determining (obtaining, identifying) of the access token of the user 105 generated by the operating system upon authorization of the user 105; the access token can be obtained by calling the system function OpenProcessToken. In another exemplary aspect, the module 110 in the course of determining the user determines the security identifier, which is stored in the access token; the security identifier can be obtained by calling the system function GetTokenInformation or LookupAccountName. The obtained access token is used by the module 110 (as the argument in the calling of one of the functions mentioned below) to apply the set of access control lists for the object of the operating system 106 to which the access on the part of the user 105 has been intercepted. In yet another exemplary aspect, the result of the determination of the aforementioned account record is the determination of a security identifier (SID). The set of access control lists can consist of one or more access control lists.

The control module 110 applies the set of ACLs for the object of the operating system 106 to the account record being used by the user 105 to obtain access to the object of the operating system 106. The module 110 applies the set of ACLs using a consecutive calling of one of the following system functions to each ACL from the set of ACLs (the number of calls being equal to the number of ACLs in the set): SeAccessCheck, AccessCheck, AccessCheckByType, AccessCheckByTypeResultList, while in each call of one of the functions the ACL is indicated as a component part (one of the fields of the DACL data structure) of the security descriptor—the argument of the function. The account record of the user 105 being used for the access is also considered when applying the set of ACLs: the result of the determination of the account record of the user 105 by the control module 110 is indicated as the parameter of the aforementioned functions (in one exemplary aspect, the name of the parameter is ClientToken). If even one of the function calls designates for the AccessStatus variable (the output parameter of the corresponding function call) a pointer value at whose address the value FALSE is found (namely, the memory region containing a value designated as FALSE in the OS Windows is located at the address), the control module 110 makes a decision to block access to the object 106, otherwise the control module 110 makes no decision on the blocking of access to the object 106. In other words, if even one ACL denies access to the object 106, the access will be blocked, otherwise the access will not be blocked. Thus, the control module 110 makes a decision to block access to the object 106 by applying the set of ACLs for the object 106 to which access is being requested by the user 105 to the account record of the user 106 (namely, to the results of the determination of the account record). In one exemplary aspect, the blocking of access is the termination of the call (namely, the execution) of the corresponding function which is being used for access to the object 106.

The set of ACLs used by the control module 110 may be provided by the translation module 120. In one exemplary aspect, the translation module 120 provides the set of ACLs for the object of the operating system 106 to which access has been intercepted by the module 110 in response to the identifier of the object 106 arriving from the control module 110. The identifier of the object of the operating system can be at least: a file identifier in the file system, such as the path to the file on the data storage device, if the object 106 is a file; a process identifier (ProcessID); or any other information uniquely identifying the object in the OS.

In one exemplary aspect, when making the decision on blocking access to the object of the operating system 106 (and, accordingly, during the actual blocking) the control module 110 transmits a notification to the application control module 140 to eliminate the mentioned object of the operating system 106 from the verification which is done by the application control module 140. Having received such a notification, the application control module 140 excludes said object 106 from the verification being done by the application control module 140. In one exemplary aspect, the application control module 140 verifies the possibility of access using the account record of the user 105 to the object of the operating system 106. From the results of the verification, a decision can be made whether to block the access or allow the access. It should be noted that, in a given case, the use of the access control system based on ACLs enables to shorten the time spent by the application control module 140 on verifying the group of objects of the operating system (such as files), since no verification will be done for certain objects by the application control module 140 after receiving the corresponding notification from the control module 110.

In yet another exemplary aspect, upon launching the computing device on which the control module 110 resides, a driver, which is part of the module 110 and which is used by the module 110 to intercept access to the object 106, is the first to be loaded into the random access memory (and executed in the random access memory). The translation module 120 can be loaded into the random access memory (and accordingly is executed in the random access memory) later on, since when the computing device is launched a number of applications and services are generally started at the same time, and an interval of time may pass between the loading into the random access memory of the computing device of the driver from the module 110 and the translation module 120. In such a case, the driver which is part of the module 110 will intercept access to the objects of the operating system and preserve all necessary information for the further working of the module 120 (such as the access token or identifier of the object 106).

In one exemplary aspect, said driver which is part of the module 110 halts the access to the object of the operating system 106 until a decision is made by the control module 110 whether to block access to the object 106 or not. In yet another exemplary aspect, the access to the object of the operating system 106 is not halted until a decision is made by the control module 110 whether to block the access to the object 106 or not. In one exemplary aspect, the halting of access includes the driver retaining control in the address space of that driver (namely, in the part of the address space of the process gaining access in which an image of the driver loaded into the random access memory is located)—the instructions located in the address space of the mentioned process, but beyond the bounds of the driver loaded in memory, will not be executed until the aforementioned halting of access is executed. After making the decision whether or not to block access to the object 106 by the control module 110, the halting of access is terminated—access will either be blocked or allowed.

In one exemplary aspect, the translation module 120 is connected to the control module 110 and configured to generate a set of at least one ACL for the object of the operating system on the basis of at least one rule of access to the mentioned object (translation of the rules of access into sets of ACLs); in this, the translation module is operating in the user mode.

The rules of access used by the module 120 for translation into a set of ACLs are stored in a database of access rules 130 and may be used the application control module 140.

As was indicated above, a rule of access to an object of the operating system is an access rule which describes the access mode to the object of the operating system on the part of at least one user (or group of users), and it also has one of two attributes: "default deny" or "default access"; the access mode being either "access allowed" or "access denied". It should be noted that often the access rules to an object describe an access not to an object of the operating system 106 taken separately, but to a whole group of objects 106 falling into a certain category (a category of objects of the operating system) which subsumes a certain group of objects of the operating system, an example of such categories being "browser", "software developed by Microsoft", and "software created in 2013".

It should be noted that there may be an unlimited number of categories and may be formed by the network administrator or by any other specialist responsible for the network security and the computing device, at their discretion. The forming of a category includes the creation of a rule for the categorization of an object of the operating system 106 in a certain category based on the metadata of the object of the operating system 106. The metadata of the object may be any information describing the object 106 to which access may be gained by the means provided by the operating system, such as the system functions. In the general case, the metadata may be different for different kinds of objects, such as files or registry keys. An example of the metadata of an object 106, provided that the object 106 is a file, may be: the date of creation, the file owner, the owner of the EDS (electronic digital signature) with which the file is signed, the hash sum of the file, the public key of the owner of the aforementioned EDS, as well as any other information from the EDS of the file. The object of the operating system 106 may belong to several categories at the same time. The rule for categorization of an object of the operating system 106 in a certain category is a rule matching up a set of metadata of an object 106 with a certain category of object of the operating system.

Examples of rules for categorization of metadata of an object 106 in a category may include, but not limited to, the following rules:

if the object of the operating system is signed by a digital signature, and the owner of the digital signature is Microsoft, the object is placed in the category of "software developed by Microsoft"; and if the object of the operating system is a file and has the name "plugin-container.exe" or "firefox.exe", the object is placed in the category of "Mozilla Firefox browser".

The categorization rules of the object 106 are used to determine the categories of the object 106 by the translation module 120 and are stored in the module 120. In yet another exemplary aspect, the categorization rules are stored in the database 130. Some of the metadata of the object 106 which is used by the translation module 120 to determine the categories of the object 106 is accessible (by calls of the respective system functions) only from user mode, for example, information about the digital signature of the file. This fact is what dictates the need for the functioning in user mode of the translation module 120, which determines the categories of the object 106 and, accordingly, the access rules applicable to the object 106. After the determining of all the categories into which the object 106 falls, the translation module 120 forms the set of ACLs for this object 106 on the basis of all the access rules for the object 106 (namely, the access rules which describe the access to the objects of the operating system from the categories to which the object 106 belongs).

Schematically, the access rule can be presented in the following form: $R_i=(\{(U, A)\}, P)$, where $R_i$ is the rule for access to an object of the operating system of i-th category (in other words, a certain category of objects of the operating system to which the object of the operating system belongs in keeping with the categorization rules of the metadata of the object of the operating system in categories), P is the attribute (either default deny or default access), $\{(U,A)\}$ is a set of pairs $(U_k,A_k)$, where $U_k$ is a certain (e.g., the k-th) user or group of users of the computing device (the security identifier, SID, acts as this parameter of the rule; and in another exemplary aspect, the access token may be used), $A_k$ is the access mode (deny or allow access: "access deny" or "access allowed", respectively) by the user or group of users $U_k$. Thus, the rule of access to the object of the operating system of i-th category saves a set of access modes on the part of each user or group of users as indicated in the context of the rule, as well as the attribute of this access rule.

An example of the use of access rules by the application control module 140 is provided next. Let the object 106 belong to several categories, we shall call them "category 1" and "category 2", respectively. For the objects of the operating system of these categories, the access rules $R_1$ and $R_2$ exist, respectively. Let $$R_1 = \left(\begin{pmatrix} user1, & \text{access denied} \\ group1, & \text{access allowed} \end{pmatrix}, \text{default deny}\right),$$

$$R_2 = ((user2, \text{ access denied}), \text{default access}).$$

where user1 and user2 are the designations of the account records (1 and 2, respectively), while group1 is a group of users. The users user1 and user2 belong to the group of users group1. If access to an object of the operating system 106 is requested with the use of the account record user1, then in keeping with rule $R_1$ this access will be denied ("user1, access denied") by the application control module 140 even though, in accordance with rule $R_2$, access should be allowed (due to the default access attribute), but the application control module 140 analyzes all the rules for access to the object 106 (namely, the rules of access to all the categories to which the object 106 belongs), and the decision to block access has higher priority. If access to the object 106 is requested with the use of the account record user2 (belonging to group1), the access will be denied in accordance with rule $R_2$ (user2, access denied). Let there be yet another account record of user user3, and let this account record belong to group1. In this case, access will be allowed in accordance with rule $R_1$ (group1, access allowed) and rule $R_2$ (default access). If there are no appropriate access rules for the object 106—the object 106 belongs to categories for which there are no access rules, or the object does not belong to any known category—then the decision whether to block access or not is made by the application control module 140 on the basis of the working parameter of the module 140 "default access" or "default deny", in one exemplary aspect, if the working parameter is not explicitly specified, it is taken to be equal to "default access". Taking into account the abovementioned features of the access rules, the main task of the translation module is to formulate a set of ACLs for the object of the operating system 106 whose application by the control module 110 to the account record of the user, which is being used to request access to the object 106, results in the making of the same decision by the module 110 to block (or to allow access), as when using by the application control module 140 access rules used to form said set of ACLs.

Using the adopted designations, the ACL for the j-th object of the operating system (a certain object of the operating system) can be represented as follows: $ACL_j=\{(U, A)\}$. The access control list in the given context can be described as follows: the access control list to the j-th object of the operating system contains a set of pairs which store the access mode A by a certain user or group of users—U, the ACL having by default the attribute "default deny".

The difference in structure of the access rule and the access control list (the presence of the mandatory attribute "default deny" in the ACL) dictates the characteristics of the formation of the set of ACLs consisting of at least one ACL on the basis of at least one access rule.

The scheme for the converting of the access rules into the set of ACLs will appear as follows. Let R be a set of access rules to an object of the operating system 106. It should be noted that the set R of access rules to the object 106 contains only the access rules to each category to which said object 106 belongs.

1. For all the access rules to the object of the operating system 106 from R, a sorting of the sets (U, A) is done, such that the first pairs in these sets are the pairs ($U_i$, $A_i$), where $A_i$ is "access denied".
2. The first access rule $R_1$ is selected from R, the current ACL is formed, being empty, and also an empty temporary ACL.
3. If the access rule $R_j$ (in the first iteration j=1) has the attribute "default access", then:
    a. all the pairs ($U_i$, $A_i$) of $R_j$ in which $A_i$ is "access denied" are copied into the current ACL;
    b. while in the event that the working parameter "default deny" has been established for the application control module 140, and as of yet no "access denying" rule $R_{deny}$ has been found for which the attribute P is "default deny", then all the pairs ($U_i$, $A_i$) of $R_j$ in which $A_i$ is "access allowed" are copied into the temporary ACL.
4. If the access rule $R_j$ (in the first iteration j=1) has the attribute "default deny", then:
    a. if as of yet no "access denying" rule $R_{deny}$ has been found for which the attribute P is "default deny", then all the pairs ($U_i$, $A_i$) of $R_{deny}$ are copied into the current ACL, which is saved in the resulting set of ACLs, and also a new, empty, "current ACL" is created;
    b. the current rule $R_j$ is recognized as being a "denying" rule $R_{deny}$ (in other words, $R_{deny}$ shall be used in the following to designate the rule being considered in the current iteration as $R_j$).
5. The next access rule from R is selected as $R_j$ (the value j being incremented by one unit), if such a rule is present we return to step 3 (the next iteration), otherwise we move on to the next step 6.
6. If as of yet no "access denying" rule $R_{deny}$ has been found for which the attribute P is "default deny", then all the pairs ($U_i$, $A_i$) of $R_{deny}$ are copied into the current ACL.
7. But if an "access denying" rule $R_{deny}$ has been found for which the attribute P is "default deny", then:
    a. if the working parameter "default deny" has been established for the application control module 140, all pairs ($U_i$, $A_i$) are copied from the temporary ACL into the current ACL;
    b. if the working parameter "default access" has been established for the application control module 140, there is added to the current ACL the pair ($U_i$, $A_i$), where Ai is "access allowed", and Ui is the group of users "EVERYONE" (for example, the line "EVERYONE" is indicated as the line whose indicator is a member of the structure TRUSTEE, see msdn.microsoft.com/ruru/library/windows/desktop/aa379636(v=vs.85) .aspx.
8. The resulting set of ACLs obtained, taken together with the current ACL, is the set of ACLs for the object of the operating system 106 which is formed on the basis of the access rules to the mentioned object of the operating system 106.

The aforementioned resulting set of ACLs is also the result of the formation of a set from at least one ACL on the basis of at least one access rule to an object of the operating system 106. When forming the set of ACLs for each individual object of the operating system being accessed by the user 105, this set is formed by the translation module 120 on the basis of the access rules to that object (namely, the categories of the objects) which are stored in the database of access rules 130.

The aforementioned method of forming the set of ACLs guarantees that the formulated set of ACLs for the object of the operating system 106 consists of the minimum possible number of ACLs describing the control of access to the object of the operating system 106 in keeping with the access rules for that same object 106.

The translation module 120 is able to send to the control module 110 the set of ACLs in response to the identifier of the object of the operating system 106 being accessed. Every ACL of the set of ACLs sent will be an ACL for said object 106, namely, for each category of objects of the operating system to which the object 106 belongs (said ACLs describe the access limitations in regard to said object 106).

It should be noted that the translation module 120 can form, on the basis of the access rules, sets of ACLs for different objects without obtaining any identifier of an object of the operating system 106 from the control module 110 and save the resulting sets of ACLs, for example in the database of access rules 130, or send the resulting sets of ACLs directly to the control module 110. In one exemplary aspect, the translation module 120 monitors changes in the database of access rules 130 used by the application control module 140 and upon appearance of a new access rule (or a change in an existing one) for a particular object of the operating system 106 it either forms a new set of ACLs for access to that object of the operating system or updates the existing set (taking into account the above-described rules for categorization of the metadata of the object 106 in categories of objects of the operating system), the updating of an existing set of ACLs also being done in accordance with the above-described algorithm for the formation of the set of ACLs. In one exemplary aspect, the translation module 120 can save the sets of ACLs formed in this way in the database of access rules 130 and provide these sets, for instance on request from the control module 110. In yet another exemplary aspect, the translation module 120 is able to form sets of ACLs for objects of the operating system without obtaining any identifiers of those objects, for example, upon appearance on the computing device (in the memory of the computing device) of a new, previously unknown object of the operating system (for which there is no corresponding set of ACLs). In yet another exemplary aspect, the reason for a repeat formation of the set of ACLs for the objects of the operating system 106 on the computing device by the translation module 120 is a change in the working parameters of the application control module (from "default deny" to "default access" or vice versa). After the forming of the set of ACLs for an object of the operating system 106, the translation module may save this set in the database of access rules 130 or send it to the control module 110 for storage, the control module 110 being able to save the sets of ACLs in its own internal storage.

Figure 2:
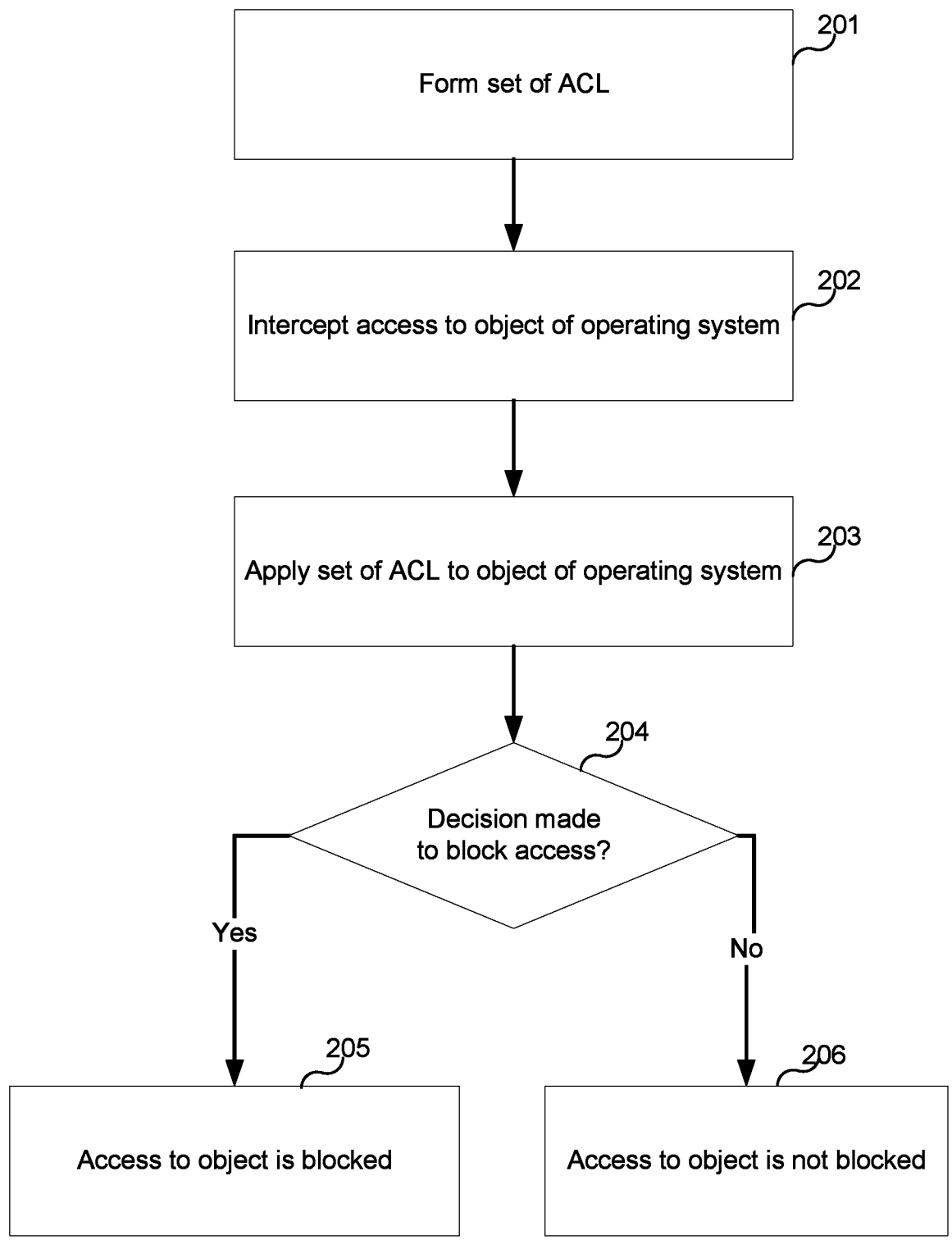
FIG. 2 shows an example of a method for access control using ACL.

FIG. 2 illustrates an exemplary method of access control based on ACLs. In step 201 the translation module 120 forms a set from at least one ACL for an object of the operating system 106 on the basis of at least one access rule to that object 106. This set of ACLs is sent to the control module 110. In step 202 the control module 110 intercepts access to the object of the operating system 106 and determines the account record of the user 105 being used to request said access. Next, in step 203, the control module 110 applies the set of ACLs for the object 106, received from the translation module 120, to the results of the determination of the account record of the user 105, the applying of the set of ACLs resulting in a decision whether or not to block the access to the object 106. If, in step 204, the control module 110 has made a decision to block access to the object of the operating system 106, then in step 205 the control module 110 blocks the access by the user 105 to the object of the operating system 106. Otherwise, the control module 110 allows access to the object of the operating system 106.

In one exemplary aspect, when the database of access rules 130 does not have any access rules, the control module 110 makes a decision whether to block access to the object of the operating system 106 or not on the basis of the working parameter of the application control module 140 (if such a parameter has been established), taking on the values of "default access" or "default deny". If there are no access rules in the database of access rules 130 for the object of the operating system 106 whose access has been intercepted by the control module 110, the control module makes a decision to block access to that object 106 if the working parameter "default deny" has been established for the application control module 140. If there are no access rules in the database of access rules 130 for the object of the operating system 106 whose access has been intercepted by the control module 110, the control module makes a decision not to block access to that object 106 if the working parameter "default access" has been established for the application control module 140.

In one exemplary aspect, the set of ACLs formed by the translation module 120 is not sent directly to the control module 110, but saved for example in the database of access rules 130 together with the identifier of the object 106. In such a case, after step 202 the control module uses the identifier of the object 106 to obtain from the database 130 the set of ACLs needed for its further working.

It should be noted that in the aforementioned sequence of steps, certain steps are carried out in user mode, and others in kernel mode, eliminates the need, upon detecting access to a certain object of the operating system 106, to make a decision on its blocking with a switching of the operating modes of the module—from kernel mode to user mode and vice versa—since the steps carried out in user mode to form the set of ACLs for the object 106 can be performed ahead of time, and the obtained set of ACLs becomes accessible to system components working in kernel mode, which are able to make a decision at once as to the blocking or allowing of access to the object 106 upon intercepting of access to the object 106, without switching their operating mode.

In one exemplary aspect, upon blocking access to an object of the operating system 106 that object is excluded by the control module 110 from the verification which is done by the application control module 140.

It should be noted that in one exemplary aspect, the step of forming the set of ACLs by the translation module 120 occurs after the control module 110 intercepts the access to the object of the operating system 106 and sends to the translation module 120 the identifier of the object of the operating system 106 being accessed.

In yet another exemplary aspect, in a situation when the components of the control module 110 are loaded into the random access memory of the computing device first as compared to the components of the translation module 120, the control module 110 preserves all information needed for the further working of the module 120 (such as the identifier of the object 106 whose access was intercepted by the control module 110). After the complete loading of the translation module 120 (namely, the components of the module 120), this module continues working in accordance with the above-described scheme, the aforementioned information preserved by the control module 110 being used by the translation module 120 for the subsequent forming of the set of ACLs for all the objects of the operating system whose access was intercepted by the control module 110 up to the time of complete loading of the translation module 120.

In yet another exemplary aspect, when the translation module 120 receives from the control module 110 the identifier of an object of the operating system 106, the translation module 120 forms a set of ACLs not only for the object whose identifier was received from the module 110, but also for other objects of the operating system: if the object of the operating system 106 is a file or registry key, then the translation module forms a set of ACLs not only for the object 106, but also forms sets of ACLs for objects of the operating system located together with the object 106 on the same level of the treelike storage structure for the objects of the operating system (the treelike system of directories for files and registry keys)—for example, for files in the same directory as the object 106, provided that the object 106 is a file. Such an operating variant of the translation module 120 during a later request made of it by the control module 110 makes it possible not to waste time in forming a set of ACLs for the object of the operating system if it is on the same level as the object 106, since such a set of ACLs has already been formed. As soon as the translation module 120 forms a set of ACLs for the object 106, this set will be sent at once to the control module 110, and the forming of other sets of ACLs will be done in parallel with the carrying out of the other steps of the method by the control module 110 (in "background mode"). A gain in speed of execution of the method is achieved on the following assumption: if access to a certain object of the operating system 106 has occurred, there is a likelihood that there will then be an access to "neighboring" objects—objects of the operating system located along with the object 106 on the same level of the treelike storage structure for the objects of the operating system (for example, files in the same directory). Thus, during the later accessing of certain "neighboring" objects of the operating system, the speed of making a decision to block access to those objects will be less, thanks to the simultaneous execution of the steps of the method described herein.

Figure 3:
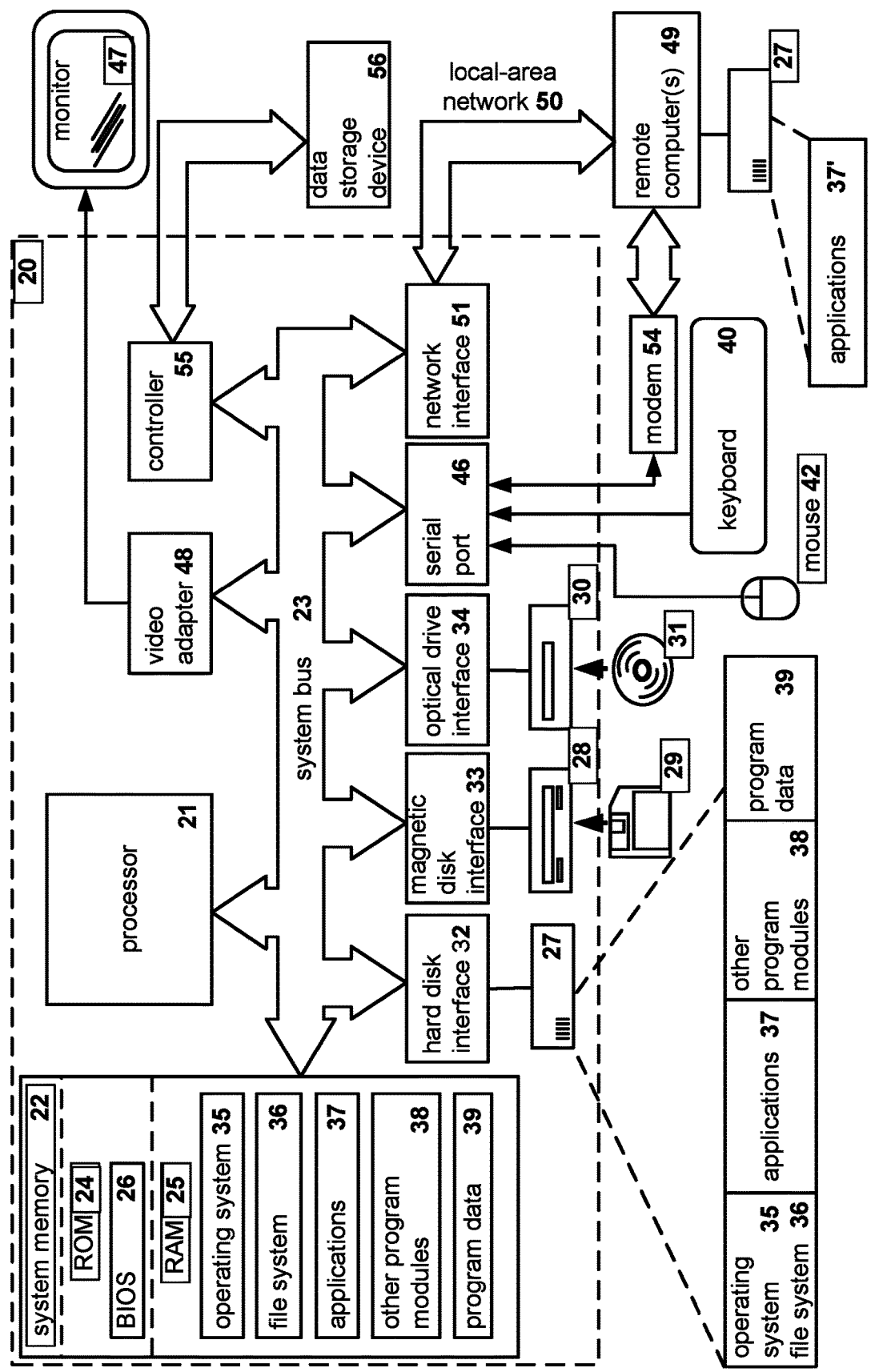
FIG. 3 shows an example of a general-purpose computer system on which the aspects of the systems and methods of access control based on access control lists (ACL) can be implemented.

FIG. 3 is a diagram illustrating an example computer system on which aspects of systems and methods for access control using access control lists (ACL) may be implemented in accordance with an exemplary aspect of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, as well as those based on neuromorphic chips (neurosynaptic chips), which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1-2, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for controlling access to objects of an operating system (OS) using Access Control Lists (ACLs), the method comprising:
   for each object of one or more objects of the OS, generating, while the OS is in a user mode, one or more ACLs based on at least one access rule specifying an access mode to the object by one or more users, wherein the access mode specifies at least whether access to the object is to be allowed or denied and when the object is a file further generating one or more ACLs for one or more other objects of the OS located together with the object on a same level of a treelike file directory;
   intercepting a request, from a user of the one or more users, to access an object of the one or more objects of the OS while the OS is in a kernel mode;
   determining one or more ACLs associated with the requested object while the OS is operating in the kernel mode;
   applying the determined one or more ACLs while the OS is operating in the kernel mode without switching the OS to the user mode, the application being performed to decide whether to allow or deny access to the requested object by the user; and
   when at least one of the applied ACLs denies access to the object, blocking access, by the user, to the object and eliminating subsequent decisions on whether or not to allow access, by the user, to the object and all other objects of the OS located together with the object on the same level of the treelike file directory.

2. The method of claim 1, wherein the one or more ACLs are applied using a consecutive calling of system functions to each ACL, and when the at least one of the applied ACLs denies access to the object, the access is blocked, and the access is allowed only when all of the applied ACLs allow access to the object.

3. The method of claim 1, wherein the ACL is presented in a form:
   $ACL_j = \{(U, A)\}$,
   where $ACL_j$ is an access control list for the j-th object of the operating system,
   A is the access mode for a user U, and
   wherein the ACL has by default an attribute "default deny".

4. The method of claim 1, wherein access rules specify access mode to the object based on one or more categories to which the object belongs and metadata of the object is used to identify the one or more categories.

5. The method of claim 4, wherein when the object is a file, the metadata of the object includes at least one of: a date of creation of the file, a file owner, an owner of an Electronic Digital Signature (EDS) with which the file is signed, a hash of the file, and a public key of the owner of the EDS.

6. The method of claim 4, wherein the access rule is presented in a form: $R_i = (\{(U, A)\}, P)$,
   where $R_i$ is the access rule for an object of the operating system of i-th category, P is an attribute: default deny or default access, and
   $\{(U,A)\}$ is a set of pairs $(U_k, A_k)$, where $U_k$ is a k-th user, $A_k$ is the access mode: access deny or access allowed, to the user $U_k$.

7. A system for controlling access to objects of an operating system (OS) using Access Control Lists (ACLs), the system comprising:
   a hardware processor configured to:
      for each object of one or more objects of the OS, while the OS is in a user mode, generate one or more ACLs based on at least one access rule specifying an access mode to the object by one or more users, wherein the access mode specifies at least whether access to the object is to be allowed or denied and when the object is a file, further generating one or more ACLs for one or more other objects of the OS located together with the object on a same level of a treelike file directory;
      intercept a request, from a user of the one or more users, to access an object of the one or more objects of the OS while the OS is in a kernel mode;
      determine one or more ACLs associated with the requested object while the OS is operating in the kernel mode;
      apply the determined one or more ACLs while the OS is operating in the kernel mode without switching the OS to the user mode, the application being performed to decide whether to allow or deny access to the requested object by the user; and
      when at least one of the applied ACLs denies access to the object, block access to the object by the user and eliminate subsequent decisions on whether or not to allow access, by the user, to the object and to all other objects of the OS located together with the object on the same level of the treelike file directory.

8. The system of claim 7, wherein the one or more ACLs are applied using a consecutive calling of system functions to each ACL, and when the at least one of the applied ACLs denies access to the object, the access is blocked, and the access is allowed only when all of the applied ACLs allow access to the object.

9. The system of claim 7, wherein the ACL is presented in a form:

$ACL_j=\{(U, A)\}$, where $ACL_j$ is an access control list for the j-th object of the operating system, A is the access mode for a user U, and wherein the ACL has by default an attribute "default deny".

10. The system of claim 7, wherein access rules specify access mode to the object based on one or more categories to which the object belongs and metadata of the object is used to identify the one or more categories.

11. The system of claim 10, wherein, when the object is a file, the metadata of the object includes at least one of: a date of creation of the file, a file owner, an owner of an Electronic Digital Signature (EDS) with which the file is signed, a hash of the file, and a public key of the owner of the EDS.

12. The system of claim 10, wherein the access rule is presented in a form: $R_i=(\{(U, A)\}, P)$, where $R_i$ is the access rule for an object of the operating system of i-th category, P is an attribute: default deny or default access, $\{(U,A)\}$ is a set of pairs $(U_k, A_k)$, and where $U_k$ is a k-th user, $A_k$ is the access mode: access deny or access allowed, to the user $U_k$.

13. A non-transitory computer readable medium storing thereon computer executable instructions for controlling access to objects of an operating system (OS) using Access Control Lists (ACLs), including instructions for:

for each object of one or more objects of the OS, generating, while the OS is in a user mode, one or more ACLs based on at least one access rule specifying an access mode to the object by one or more users, wherein the access mode specifies at least whether access to the object is to be allowed or denied and further generating one or more ACLs for one or more other objects of the os located together with the object on a same level of a treelike file directory;

intercepting a request, from a user of the one or more users, to access an object of the one or more objects of the OS while the OS is in a kernel mode;

determining, one or more ACLs associated with the requested object while the OS is operating in the kernel mode;

applying, the determined one or more ACLs while the OS is operating in the kernel mode without switching the OS to the user mode, the application being performed to decide whether to allow or deny access to the requested object by the user; and when at least one of the applied ACLs denies access to the object, blocking access, by the user, to the object and eliminating subsequent decisions on whether or not to allow access, by the user, to the object and all other objects of the OS located together with the object on the same level of the treelike file directory.

14. The non-transitory computer readable medium of claim 13, wherein the one or more ACLs are applied using a consecutive calling of system functions to each ACL, and when the at least one of the applied ACLs denies access to the object, the access is blocked, and the access is allowed only when all of the applied ACLs allow access to the object.

15. The non-transitory computer readable medium of claim 13, wherein the ACL is presented in a form: $ACL_j=\{(U, A)\}$, where $ACL_j$ is an access control list for the j-th object of the operating system, A is the access mode for a user U, and wherein the ACL has by default an attribute "default deny".

16. The non-transitory computer readable medium of claim 13, wherein access rules specify access mode to the object based on one or more categories to which the object belongs and metadata of the object is used to identify the one or more categories.

17. The non-transitory computer readable medium of claim 16, wherein, when the object is a file, the metadata of the object includes at least one of: a date of creation of the file, a file owner, an owner of an Electronic Digital Signature (EDS) with which the file is signed, a hash of the file, and a public key of the owner of the EDS.

18. The non-transitory computer readable medium of claim 16, wherein the access rule is presented in a form: $R_i=(\{(U, A)\}, P)$, where $R_i$ is the access rule for an object of the operating system of i-th category, P is an attribute: default deny or default access, $\{(U,A)\}$ is a set of pairs $(U_k, A_k)$, and where $U_k$ is a k-th user, $A_k$ is the access mode: access deny or access allowed, to the user $U_k$.

* * * * *